United States Patent [19]

Wünsch

[11] 4,274,642
[45] Jun. 23, 1981

[54] TOOL CHUCK

[75] Inventor: Steffen Wünsch, Dettenhausen, Fed. Rep. of Germany

[73] Assignee: Robert Bosch GmbH, Stuttgart, Fed. Rep. of Germany

[21] Appl. No.: 7,260

[22] Filed: Jan. 29, 1979

[30] Foreign Application Priority Data

Feb. 25, 1978 [DE]  Fed. Rep. of Germany ....... 2808253

[51] Int. Cl.³ ............................................. B23B 31/04
[52] U.S. Cl. .................................... 279/62; 279/1 K; 279/60
[58] Field of Search ...................... 279/60, 61, 62, 63, 279/1 K, 19, 19.4

[56] References Cited

U.S. PATENT DOCUMENTS 2,458,626  1/1949  Norige .................................. 279/62

FOREIGN PATENT DOCUMENTS 1293671  4/1969  Fed. Rep. of Germany ............ 279/62
1035672  7/1966  United Kingdom ..................... 279/62

*Primary Examiner*—Z. R. Bilinsky
*Attorney, Agent, or Firm*—Frishauf, Holtz, Goodman & Woodward

[57] ABSTRACT

In order to improve the holding power of a tool chuck, especially a tool chuck for use with percussion or impact drills, without the use of elastic friction elements that impede intentional opening and closing, the invention describes a tool chuck in which cooperating, preferably conical surfaces disposed respectively, on the stationary collet and the rotating structure of the chuck engage one another when the chuck is closed and clamps the inserted tool. Additional relative rotation imparted to the rotating structure with respect to the collet causes clamping forces to be applied to the inserted tool and further causes the cooperating conical surfaces to be pressed against one another, thereby generating high surface pressures which oppose the unintentional opening of the chuck even during the presence of axial percussion shocks.

4 Claims, 4 Drawing Figures

TOOL CHUCK

FIELD OF THE INVENTION

The present invention relates to a chuck for holding drills of various sizes, especially for use in percussion or hammer drills. More particularly, the invention relates to a drill chuck which includes a provision for preventing the unintentional opening of the chuck during use.

BACKGROUND AND PRIOR ART

Drill chucks are known which include a friction brake, consisting of, for example, an elastic O-ring which is disposed between respective cylindrical surfaces of the chuck bushing and the internal chuck members. The known friction device has the disadvantage that intentional opening of the chuck is impeded during the entire opening process. For this reason, the frictional forces must be kept relatively weak which diminishes the effectiveness of the known device to accomplish its purpose, i.e., to prevent the unintentional opening of the drill chuck.

THE INVENTION

It is a principal object of the present invention to so construct a drill chuck that the frictional forces opposing the unintentional opening of the chuck jaws are effective when the chuck jaws are tightened and becoming effective only during an intentional opening of the chuck. Briefly according to the invention a frictional brake in form off conical surfaces is located between the rear support face of the threaded part of the chuck and an associated surface of the chuck collet. Due to this construction, the frictional brake becomes effective only while the chuck jaws are tightened and while the threaded part of the chuck bears against the collet with its rear surface. When the chuck is released intentionally, the threaded part of the chuck which pulls back the chuck jaws bears against the collet with its front surface, thereby relieving the frictional brake and making it ineffective in opposing the opening motion of the chuck.

The absence of a commonly used O-ring is another saving of material and cost. The conical surfaces which act as support and as brakes can be provided on the threaded ring as well as on the outer bushing and on the latter both in its forward or central region.

Further advantages of the invention as well as its function will become apparent from a detailed description of preferred embodiments which are illustrated in the drawing.

THE DRAWING

DESCRIPTION OF THE PREFERRED EMBODIMENTS

Figure 1:
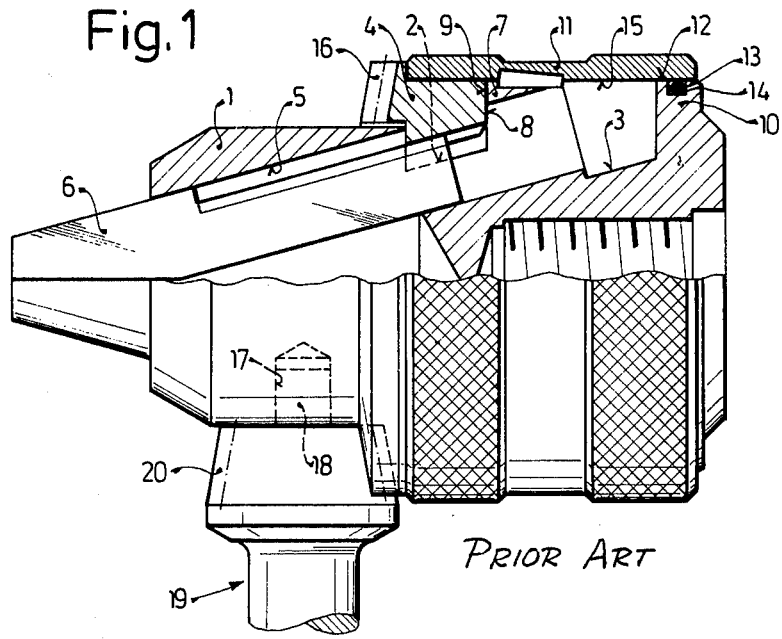
FIG. 1 is an illustration of a known drill chuck.

In the description which follows, the term "front" will be the direction leading toward the tool to be held by the chuck whereas the term "rear" will be the direction opposite thereto, i.e., toward the drill spindle which holds the drill chuck. The known drill chuck illustrated in FIG. 1 has a collet 1, the rear portion of which exhibits a first annular groove 2 and a second annular groove 3. The first groove 2 serves to guide a threaded ring 4 while the second groove 3 is provided primarily for saving weight. Terminating in the second groove 3 are three bores 5 in each of which is guided one of three chuck jaws 6.

Disposed on the collet between the first and second grooves is a central chuck jaw guide flange 7. The threaded ring 4 has a rear support surface 8, the bearing area of which is perpendicular to the central axis of the chuck and which bears against a corresponding counter surface 9 of the central guide flange 7 when the chuck is tightened around a tool. A rear closure flange 10 seals the second groove 3.

In order to permit placement of the threaded ring 4 into the first groove 2, the ring 4 consists of two parts. These two parts are held together by a pressed-on bushing 11 which shares in the rotation of the threaded ring 4.

An annular groove 13 located in the outer cylindrical surface 12 of the closure flange 10 provides for the insertion of an elastic O-ring 14 which exerts frictional pressure against the cylindrical inside surface 15 of the bushing 11. The presence of the O-ring 14 which, together with the counter surface 15, constitutes a frictional brake, impedes the unintentional opening of the chuck but, as has been pointed out above, also impedes the intentional release of the drill chuck.

The threaded ring 4 is provided with a frontal conical gear rack 16 associated with a plurality of cylindrical radial holes 17 which serve to receive the tip 18 of a chuck key 19 whose own conical teeth 20 engage the conical gear 16 of the threaded ring. The chuck key 19 serves to open and close the chuck by rotation of the threaded ring 4 with respect to the collet 1.

Figure 2:
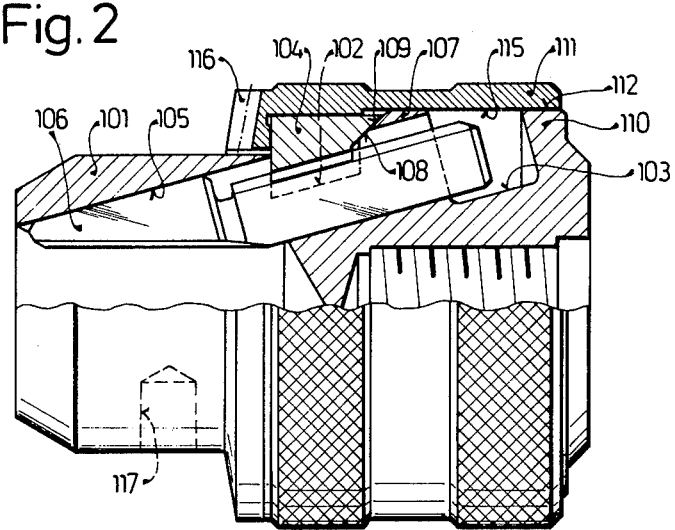
FIG. 2 is an illustration of a first embodiment of the invention in which the threaded ring has a rear support surface.

FIG. 2 is an illustration of a first embodiment of a drill chuck according to the invention. The reference numbers in this embodiment correspond to the those of the known drill chuck of FIG. 1 with the exception of being increased by the number 100. In the embodiment of FIG. 2, the collet 101 has a first groove 102 and a second groove 103 in its rear outer region. The second groove 103 which serves to reduce weight is the terminus of three symmetric bores 105, each of which guides a chuck jaw 106 obliquely with respect to the central axis of the chuck.

Between the first and second grooves, the collet 101 has a central guide flange 107 which guides the axial motions of the chuck jaws. The threaded ring 104 has a rear support surface 108 embodied as an internal cone which bears against an externally conical, rearwardly expanding counter surface 109 of the central chuck jaw guide flange 107 when the chuck jaws 106 are pushed forward, i.e., when they are clamped around a drill bit, for example. A rear flange 110 seals the second groove 103 of the collet 101 with respect to the outside. In order to permit insertion of the threaded ring 104 into the first groove 102, the ring 104 consists of two parts which are held together by a bushing 111 pressed thereon. The cylindrical interior surface 115 of the bushing 101 cooperates with the cylindrical outer surface 112 of the rear flange 110 to form a gliding seat which seals the interior of the chuck with respect to the rear. The conical surfaces are, axially, above the jaws 106.

The front portion of the threaded ring 104 is provided with a conical gear rack 116 which is associated with a plurality of radial holes 117 which serve to receive the locating tip of a chuck key, not shown, which has conical teeth that engage the conical gear 116 of the threaded ring for the purpose of rotating the threaded ring 104 with respect to the collet 101.

Operation:

The chuck is closed around the tool, not shown, with the aid of the chuck key which rotates the threaded ring with respect to the collet. During this relative motion, the chuck jaws are moved forward, i.e., to the left in FIG. 2, and approach one another radially. During this motion, the rearwardly larger conical surface 108 of the threaded ring 104 bears on the counter surface 109 of the central jaw guiding flange 107. Once the chuck jaws 106 have engaged the tool to be held therein, for example a drill bit, any further rotation of the threaded ring with respect to the collet will increase the holding tension of the chuck jaws on the tool as well as increasing the force exerted on the counter surface 109 of the central jaw guiding flange 107. Accordingly, the two cooperating conical surfaces engage one another firmly and bind.

The very high surface pressure generated in this contact maintains these two surfaces in contact even when the drill chuck is subjected to axial shocks occurring in percussion or impact drilling.

If the chuck is to be released, the chuck key is used to rotate the threaded ring with respect to the collet in order to move the chuck jaws rearwardly. During this motion, the threaded ring 104 moves forward and bears against the front surface of the first groove of the collet while the pressure due to the conical surface formed by the rear of the threaded ring is released so that the chuck can be opened without substantial applications of force.

Figure 3:
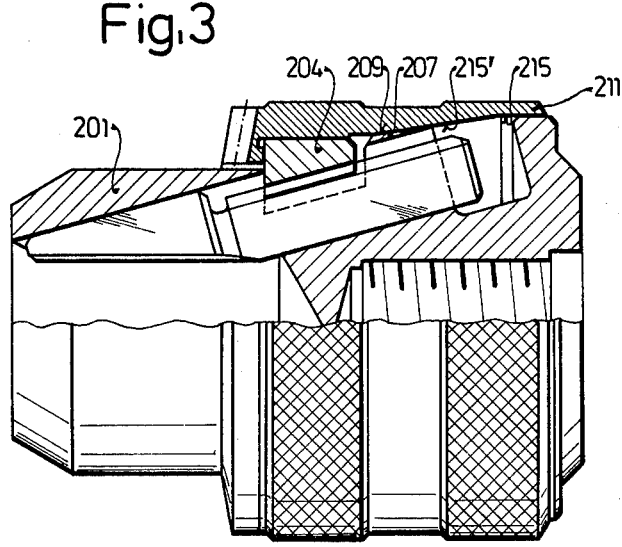
FIG. 3 is an illustration of a second embodiment of the invention in which the support surface is located in the central part of the bushing.

FIG. 3 is an illustration of a second embodiment of the invention in which the rear support surface for the rotating part of the chuck is provided on the bushing which firmly surrounds the threaded ring. Accordingly, an interior surface 215 of the bushing 211 is formed as an internal, rearwardly larger cone 215' and cooperates with a correspondingly conical counter surface 209 on the chuck jaw guide flange 207. In this embodiment of the drill chuck, the closure of the chuck causes the rotating part of the chuck, i.e., the structure composed of the two parts of the threaded ring 204 and the surrounding coaxial bushing 211, to make contact with the central jaw guide flange 207 at a conical surface of the rotating structure. The conical surfaces are axially over at least a portion of the jaws.

Figure 4:
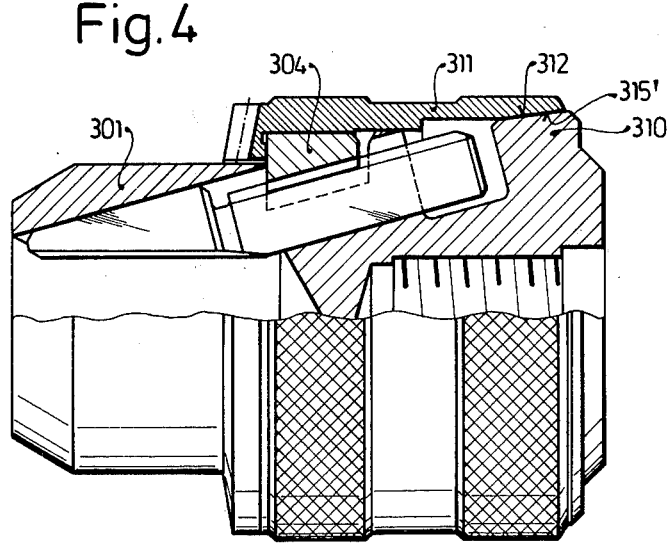
FIG. 4 is an illustration of a third embodiment of the invention in which the rear support surface is located at the rear end of the bushing.

In a third embodiment of the invention illustrated in FIG. 4, the closure of the chuck causes the rotating structure 304/311 to bear against the collet 301 at an internal conical surface 315' on the bushing 311 which bears against an external conical surface 312 provided on the rear closure flange 310 of the collet 301.

Various changes and modifications may be made to the invention and features described in connection with one of the embodiments may be used with any of the others, all within the scope of the inventive concept.

What I claim is:

1. A tool chuck particularly for a hammer or percussion drill to receive a tool at a tool receiving end thereof having a collet, the collet having oblique passages for holding and guiding a plurality of chuck jaws, said chuck further including a rotatable structure having a threaded ring surrounding said collet and engaging said chuck jaws, and a bushing coaxially surrounding said threaded ring and secured thereto to rotate therewith, and a friction brake to prevent relative rotation of the rotatable structure and said collet in one direction, while permitting rotation in the other, and automatically tightening upon blows in axial direction, comprising an inner support surface formed on said threaded ring adjacent the tool receiving end thereof;

and outer conical surfaces formed on said collet in engagement with the inner conical surfaces of said threaded ring, the conical surfaces having their larger diameter positioned remote from the tool receiving end of the chuck.

2. A tool chuck for a hammer of percussion drill to receive a tool at a tool receiving end thereof having a collet, the collet having oblique passages for holding and guiding a plurality of chuck jaws, said chuck further including a rotatable structure having a threaded ring surrounding said collet and engaging said chuck jaws, and a bushing coaxially surrounding said threaded ring and secured thereto to rotate therewith, and a friction brake to prevent relative rotation of the rotatable structure and said collet in one direction, while permitting rotation in the other, and automatically tightening upon blow in axial direction, comprising a guide flange, formed on said collet to guide the motion of said chuck jaws, positioned—in axial direction—centrally thereof and an outer conical circumferential surface formed on said guide flange axially positioned to be in alignment with at least a portion of said chuck jaws, an internal conical surface formed on said bushing axially positioned to be in alignment with at least a portion of said chuck jaws and with said outer circumferential conical surface on the guide flange for cooperation therewith said conical surfaces having their larger diameter positioned remote from the tool receiving end of the chuck;

and wherein the threaded ring in engagement with the jaws of the chuck, the collet guiding the jaws of the chuck in said oblique passages, and the bushing are connected in positive motion transmitting relation to transfer axially directed forces during percussion operation of the percussion drill directly from the jaws to the bushing over said cooperating centrally positioned conical surfaces and prevent loosening of the bushing with respect to said collet.

3. Chuck according to claim 1, wherein said conical surfaces are axially positioned to be in alignment with at least a portion of said chuck jaws.

4. A tool chuck for a hammer or percussion drill to receive a tool at a tool receiving end thereof having a collet, the collet having oblique passages for holding and guiding a plurality of chuck jaws, said chuck further including a rotatable structure having a threaded ring surrounding said collet and engaging said chuck jaws, and a bushing coaxially surrounding said threaded ring and secured thereto to rotate therewith, and a friction brake to prevent relative rotation of the rotatable structure and said collet in one direction, while permitting rotation in the other, and automatically tightening upon blows in axial direction, comprising a closure flange formed at the rear of said collet;

and an outer conical surface formed on said closure flange;

an internal conical surface formed on said bushing and cooperating with the outer circumferential conical surface on said closure flange, said conical surfaces having their larger diameter positioned remote from the tool receiving end of the chuck;

and wherein the threaded ring in engagement with the jaw of the chuck, the collet guiding the jaws of the chuck in said oblique passage, and the bushing are connected in said positive motion transmitting relation to transfer axially directed forces during percussion operation of the percussion drill directly from the jaws to the bushing over said cooperating conical surfaces and prevent loosening of the bushing with respect to said collet.

* * * * *